US007966394B1

(12) United States Patent
Talwar et al.

(10) Patent No.: US 7,966,394 B1
(45) Date of Patent: Jun. 21, 2011

(54) INFORMATION MODEL REGISTRY AND BROKERING IN VIRTUALIZED ENVIRONMENTS

(75) Inventors: Vanish Talwar, Palo Alto, CA (US); Partha Ranganathan, Fremont, CA (US); Jeff Hilland, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 12/250,924

(22) Filed: Oct. 14, 2008

Related U.S. Application Data

(60) Provisional application No. 61/047,546, filed on Apr. 24, 2008.

(51) Int. Cl.
*G06F 15/173* (2006.01)

(52) U.S. Cl. ........ 709/223; 709/202; 709/217; 709/218; 709/219; 709/220; 709/221; 709/222; 709/248; 719/313; 719/314; 719/315; 719/316; 719/317

(58) Field of Classification Search .................. 709/202, 709/219–223, 248; 719/313–317
See application file for complete search history.

(56) References Cited

U.S. PATENT DOCUMENTS

| | | | |
|---|---|---|---|
| 6,460,070 B1 | 10/2002 | Turek et al. | |
| 6,754,664 B1 * | 6/2004 | Bush ........................................ | 1/1 |
| 6,775,700 B2 * | 8/2004 | Cheng et al. ................... | 709/225 |
| 6,834,303 B1 * | 12/2004 | Garg et al. ..................... | 709/224 |
| 6,862,736 B2 * | 3/2005 | Hudis et al. .................... | 719/316 |
| 7,069,321 B1 * | 6/2006 | Curtis et al. .................... | 709/225 |
| 7,188,121 B2 * | 3/2007 | Tracey et al. ......................... | 1/1 |
| 7,228,141 B2 * | 6/2007 | Sethi ........................... | 455/456.3 |
| 7,627,593 B2 * | 12/2009 | Boykin et al. ......................... | 1/1 |
| 2002/0107872 A1 * | 8/2002 | Hudis et al. ................. | 707/104.1 |
| 2002/0108102 A1 * | 8/2002 | Muhlestein et al. .......... | 717/124 |
| 2002/0144009 A1 * | 10/2002 | Cheng et al. ................... | 709/314 |
| 2002/0199022 A1 * | 12/2002 | Tsang et al. ................... | 709/246 |
| 2003/0004956 A1 * | 1/2003 | Johnson et al. ............... | 707/100 |
| 2003/0046396 A1 | 3/2003 | Richter et al. | |
| 2003/0204557 A1 * | 10/2003 | Mandal et al. ................ | 709/202 |
| 2004/0019668 A1 | 1/2004 | Kakadia | |
| 2004/0249926 A1 * | 12/2004 | Cheng et al. ................... | 709/223 |
| 2005/0083854 A1 * | 4/2005 | Nagarajrao et al. .......... | 370/254 |
| 2005/0138144 A1 * | 6/2005 | Sethi ............................ | 709/219 |
| 2007/0073877 A1 * | 3/2007 | Boykin et al. ................ | 709/225 |
| 2008/0059599 A1 * | 3/2008 | Chokshi et al. ............... | 709/212 |
| 2008/0162683 A1 * | 7/2008 | Mukhopadhyay et al. ... | 709/223 |
| 2008/0208896 A1 * | 8/2008 | Yin et al. ................... | 707/103 R |

(Continued)

OTHER PUBLICATIONS

Distributed Management Task Force, Inc., "WBEM Discovery Using the Service Location Protocol," Jan. 27, 2004, available at: http://www.dmtf.org/standards/published_documents/DSP0205.pdf.*

(Continued)

*Primary Examiner* — Dohm Chankong

(57) ABSTRACT

A system for coordinating information between management entities includes a CIMOM registry broker storing registration information for CIMOMs in the system. The CIMOM registry broker is operable to extract objects from at least some of the CIMOMs in response to a request from an entity external to the system. The CIMOM registry broker is also operable to correlate information in the extracted objects into a single response table, and send the single response table to the entity external to the system. The system also includes a plurality of agents, wherein each agent is associated with one of the CIMOMs and is operable to communicate information from the CIMOMs to the CIMOM registry broker. The system also includes at least one management channel providing bidirectional communication between the CIMOM registry broker and the agents in the system.

20 Claims, 16 Drawing Sheets

U.S. PATENT DOCUMENTS

2009/0019082 A1* 1/2009 Reeves et al. ............ 707/103 X
2009/0113447 A1* 4/2009 Kamiyai et al. ............ 719/314
2010/0058339 A1* 3/2010 Beilmann et al. ................ 718/1

OTHER PUBLICATIONS

Tursunova et al., "A Study on Service Discovery for Web Service based Network Management," Joint Conference on Communication and Information, 2007. Available at: http://mnet.skku.ac.kr/data/2007data/JCCI2007/papers/pdf/III-D-4.pdf.*

Bumpus et al., "Discovery in the WBEM Architecture (Infrastructure Discovery)," DMTF 2003 Global Management Conference, Jun. 2003. Available at: http://www.dmtf.org/events/past/2003/gmc/presentations/GMC03_DiscoveryWBEM%20Architecture_V02.pdf.*

Anderson, O.T. et al., "Global Namespace for Files", IBM Systems Journal, vol. 43, No. 4, 2004.

Barham, P. et al., "Xen and the Art of Virtualization", ACM SOSP'03, Oct. 2003.

Chase, J. et al., "Managing Energy and Server Resources in Hosting Centers", downloaded May 19, 2008.

VMware Consolidated Backup, http://www.vmware.com/products/vi/consolidated_backup.html., downloaded May 20, 2008.

Dell Unified Manageability Architecture, Oct. 30, 2006.

Heath, T. et al., "Energy Conservation in Heterogenous Server Clusters", ACM PPoPP'05, Jun. 2005.

HP AssetCenter Software, http://h20229.www2.hp.com/products/ovacen/index.html, downloaded May 15, 2008.

HP OpenView Enterprise Discovery Software, http://h20229.www2.hp.com/products/oventd/index.html, downloaded May 15, 2008.

ACPI, Advanced Configuration & Power Interface, http://www.acpi.info/, downloaded May 19, 2008.

DMTF, Common Information Model (CIM) Standards, http://www.dmtf.org/standards/cim/, downloaded May 15, 2008.

DMTF, Web-Based Enterprise Management (WBEM), http://www.dmtf.org/standards/wbem/, downloaded May 15, 2008.

Intellegent Platform Management Interface, http://www.intel.com/design/servers/ipmi/, downloaded May 19, 2008.

OpenWBEM, http://www.openwbem.org/, downloaded May 15, 2008.

VMware, http://www.vmware.com/, downloaded May 15, 2008.

Isci, C. et al., "Live, Runtime Phase Monitoring and Prediction on Real Systems with Application to Dynamic Power Management", downloaded May 20, 2008.

Kong, J. et al., "CameraCast: Flexible Access to Remote Video Sensors"; downloaded May 20, 2008.

Kravets, R. et al., "Application-Driven Power Management for Mobile Communication", downloaded May 20, 2008.

Lee, E.K. et al., "Petal: Distributed Virtual Disks", Proc. of 7th International Conf. on Architectural Support for Programming Languages and Operating Systems, 1996.

Li, H. et al., "VSV: L2-Miss-Driven Variable Supply-Voltage Scaling for Low Power", IEEE MICRO-36, 2003.

Lu, Y. et al., "Low-Power Task Scheduling for Multiple Devices", International Workshop on Hardware/Software Codesign pp. 39-43, 2000.

Moore, J. et al., "Making Scheduling "Cool": Temperature-Aware Workload Placement in Data Centers", downloaded May 20, 2008.

Muntz, D., "Building a Single Distributed File System from Many NFS Servers", HPL-2001-176, Jul. 12, 2001.

Nathuji, R. et al., "VirtualPower: Coordinated Power Managment in Virtualized Enterprise Systems", ACM SOSP'07, Oct. 2007.

Pike, R. et al., "The Use of Name Spaces in Plan 9", downloaded May 15, 2008.

Pillai, P. et al., "Real-Time Dynamic Voltage Scaling for Low-Power Embedded Operating Systems", downloaded May 20, 2008.

Pike, R. et al., "Plan 9 from Bell Labs", downloaded May 15, 2008.

Shih, E. et al., "Wake on Wireless: An Event Driven Energy Saving Strategy for Battery Operated Devices", ACM MOBICOM'02, Sep. 2002.

Sugerman, J. et al., "Virtualizing I/O Devices on VMware Workstation's Hosted Virtual Machine Monitor", USENIX Annual Technical Conference, Jun. 2001.

Understanding Inventory, Configuration and IT Asset Management, http://h20229.www2.hp.com/solutions/asset/swp/4aa0-6093enw_asset_swp.pdf, downloade May 15, 2008.

VMware Virtual Appliance, http://www.vmware.com/appliances/, downloaded May 20, 2008.

WMI Architecture, http://msdn.microsoft.com/en-us/library/aa394553 (printer).aspx, downloaded May 15, 2008.

Wright, C. P. et al., "Versatility and Unix Semantics in a Fan-Out Unification File System", downloaded May 15, 2008.

Zhang, Z. et al., "Designing a Robust Namespace for Distributed File Services", downloaded May 15, 2008.

* cited by examiner

| FIELD NAME | TYPE | VALUE |
|---|---|---|
| SERIAL NUMBER | | |
| VENDOR TYPE | | |
| SERVER TYPE | | |
| CPU | | |
| MEMORY | | |
| DISK | | |

| FIELD NAME | TYPE | VALUE |
|---|---|---|
| HYPERVISOR TYPE | | |
| HYPERVISOR VERSION | | |
| VIRTUALIZARION CONTROL SOFTWARE | | |
| VIRTUAL MACHINE IDS | | |
| IP ADDRESS | | |

| FIELD NAME | TYPE | VALUE |
|---|---|---|
| VIRTUAL MACHINE IDS | | |
| IP ADDRESS | | |
| OS TYPE | | |
| LIST OF INSTALLED SOFTWARE | | |

*FIG. 10A*

| FIELD NAME | TYPE | VALUE |
|---|---|---|
| SERIAL NUMBER | | |
| VENDOR TYPE | | |
| SERVER TYPE | | |
| CPU | | |
| MEMORY | | |
| DISK | | |
| HYPERVISOR TYPE | | |
| HYPERVISOR VERSION | | |
| VIRTUALIZARION CONTROL SOFTWARE | | |
| IP ADDRESS | | |
| VIRTUAL MACHINE ID | | |
| IP ADDRESS | | |
| OS TYPE | | |
| LIST OF INSTALLED SOFTWARE | | |
| ⋮ | ⋮ | ⋮ |
| VIRTUAL MACHINE ID | | |
| IP ADDRESS | | |
| OS TYPE | | |
| LIST OF INSTALLED SOFTWARE | | |

*FIG. 10B*

INFORMATION MODEL REGISTRY AND BROKERING IN VIRTUALIZED ENVIRONMENTS

CROSS-REFERENCE TO RELATED APPLICATIONS

This Application claims the benefit of U.S. Provisional patent application Ser. No. 61/047,546, filed Apr. 24, 2008, which is hereby incorporated by reference in it's entirety.

BACKGROUND

Manageability is a key requirement for a broad spectrum of information technology (IT) systems ranging from laptops to blade servers to clusters to large scale data centers. With rising complexity and scale in tomorrow's, enterprise IT, systems, the management of these systems has become a dominating cost. Several independent studies found that 60-70% of IT costs today are spent on maintenance costs. A key challenge in the design of future manageability architectures is the organization and propagation of management information related to the IT infrastructure in data centers.

The Common Information Model or CIM is a standards-based approach to provide a common definition of management information for systems, networks, applications and services, and allows for vendor extensions. It is emerging to be a key component in manageability architectures and provides for standardization, an object oriented model, and deployment through web-based protocols. CIM's common definitions enable vendors to exchange semantically rich management information between systems throughout the network. CIM is composed of a specification and a schema. The schema provides the actual model descriptions, while the specification defines the details for integration with other management models. Typically, in a CIM-based infrastructure, management applications (clients) connect to a CIMOM (CIM object manager) resident on managed nodes. The CIMOM in turn invokes CIM providers that provide the requested management information to the caller.

While CIM-based systems have been extremely popular, the emerging trends towards virtualization, consolidation, and hardware enhancements presents challenges for effective management with such systems.

In current state of the art in CIM-based inventory management, per-server CIMOMs keep up-to-date information of assets at the local end-points, and periodically provide it to data center level tools that aggregate the assets across the servers and blades. With the exponential growth of the amount of inventory information relating to the software and hardware per server in modern data centers, the collection of such inventory information typically takes place through multiple CIMOM end-points, as shown in FIG. 10.

FIG. 13 shows a conventional CIM-based inventory management system. A management application 1301 external to the managed node collects inventory information from CIMOMs 1302, 1303, 1304 and 1305. For example, the hardware inventory information is provided through the CIMOM 1305 typically hosted in firmware at the management processor, shown as iLO. The management processor may communicate with processors/cores in the hardware to receive information, for monitoring the processors and managing the processors. The management processor may communicate with the managed processors using an implementation of the Intelligent Platform Management Interface (IPMI) specification, which defines a set of common interfaces for hardware and firmware which system administrators can use to monitor system health and manage the system.

Inventory information related to the hypervisor, i.e., the virtualization layer, is provided through the CIMOM 1302 in the control domain, e.g., Dom0 for the Xen Hypervisor. The CIMOMs 1303 and 1304 in each guest virtual machine (VM) provide software and application inventory information.

It is beneficial to correlate the information from the multiple CIMOMs to provide a single view of the hardware, software, and virtualization layers. For example, decisions to upgrade hardware (e.g., memory) benefit from knowing what applications are being hosted on the server. Hardware fault diagnostics decisions would benefit from knowing what applications are being affected, and knowledge of the physical platforms on which the hypervisors and VMs reside would aid in better license tracking. Correlating the hypervisor inventory information with those for the set of VMs hosted on it would aid in better statistics gathering, and correlating the per-VM inventory information with that on the hypervisor would help in better accountability and licensing.

Existing management systems, such as the system shown in FIG. 13, are operable to receive the inventory information from the CIMOMs at the hardware, software, and virtualization layers, however, the information is not correlated. Furthermore, it is difficult to correlate hardware, software, and virtualization inventory information, especially when there are thousands of CIMOMs, such as for a large data center, because the received information lacks common parameters for joining or correlation at a centralized entity in the network. In addition, having multiple non-coordinated CIMOMs leads to increased administrator workload, which leads to higher overall cost in the data center. For example, an administrator would have to be aware of the various CIMOMs at each server, their type, IP address, and other installation information to correlate all the data from the CIMOMs. When multiplied by the tens of thousands of machines in a data center, this leads to high administrator costs. If an automated software were to perform the same task, it would translate to higher complexity for the management software itself.

BRIEF DESCRIPTION OF DRAWINGS

The embodiments of the invention will be described in detail in the following description with reference to the following figures.

FIGS. 10A-B illustrate separate tables and a unified table, according to embodiments;

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a coordination architecture for a CIM-based system builds on management channels (M-channels), CIMOM registry brokers and agents. M-channels provide information exchange between firmware, hardware, virtualization layers, virtual machines (VMs) and software applications. The CIMOM registry brokers are operable to correlate information from multiple CIMOMs. The agents are used to exchange information via the M-channels between a CIMOM registry broker and CIMOMs.

The M-channels and brokers are described in detail below and in co-pending provisional U.S. patent application Ser. No. 60/989,184, hereby incorporated by reference in its entirety.

Figure 1:
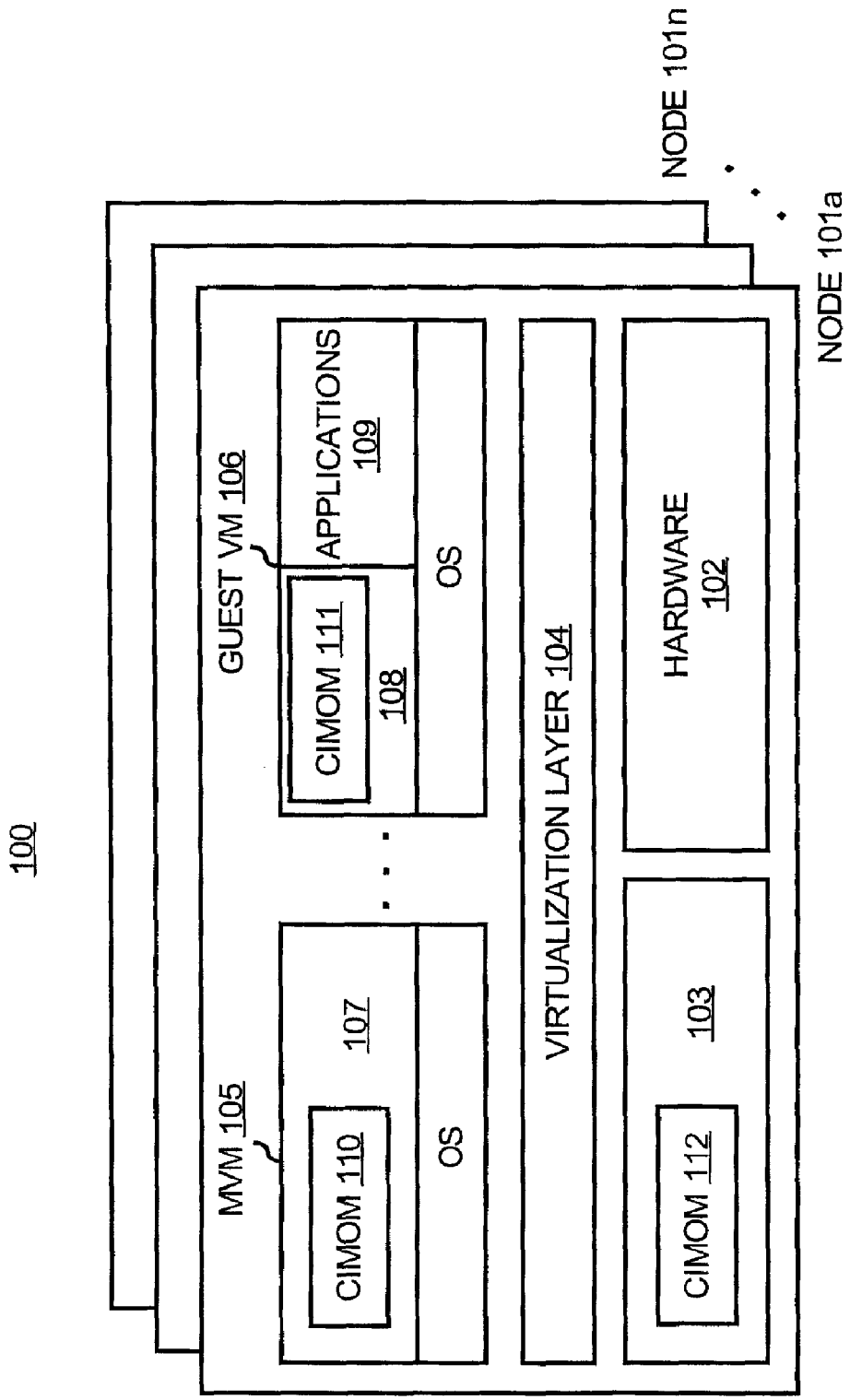
FIG. 1 illustrates a system, according to an embodiment.

FIG. 1 illustrates a system 100, according to an embodiment. The system 100 comprises a plurality of nodes 101a-n. Each node includes a set of resources comprising hardware and software that are allocated to run applications. The resources may be from a pool of resources in a resource-on-demand system. For example, resources from the pool are selected and allocated to a particular demand. The resources may be processors, memory, disks, software, etc., allocated to a demand or may be entire servers allocated to a demand.

As shown in FIG. 1, the nodes 101a-n provide virtualized environments to run host applications. As shown for node 101a, the nodes include hardware 102, such as processors, memory, disks, interfaces, etc, and component hardware, such as a SMI-S (Small and Medium Industry compliant) ROC (Raid on Chip) or storage controller. The hardware 102 stores and runs software described below, including VMs, operating systems, management applications, M-brokers, M-agents, etc. The nodes also include management hardware 103. Management hardware may included a management processor, such as Hewlett-Packard's iLO/GSP, Intel's AMT, and IPMI compliant BMC KO stands for Integrated Lights Out, GSP stands for Guardian Service Processor, AMT stands for Active Management Technology, IPMI stands for Intelligent Platform Management Interface and BMC stands for Baseboard Management Controller). A management processor may communicate with processors/cores in the hardware 102 to receive information, for monitoring the processors and managing the processors. The management processor may include firmware for performing management functions on the processors, such as powering on or off or rebooting, monitoring temperature, power, and other attributes, and performing other management functions. The management hardware 103 may include other hardware, such as sensors, storage controllers, etc.

A virtualization layer 104 creates a virtualized environment for running VMs, such as the management VM (MVM) 105 and the guest VM 106. The virtualization layer 104 allows multiple operating systems to be run on the hardware 102 at the same time. The virtualization layer 104 includes software for managing the VMs, including creating, starting, stopping and removing virtual machines from a hardware platform. One example of the virtualization layer 104 is the Xen hypervisor.

Each VM in the node 101a may include an operating system and applications. The MVM 105 is a special VM that includes administrative and management software 107 for managing guest VMs running on the hardware 102. The guest VM 106 runs management software application(s) 108 for managing the VM and communicating information with the MVM 105. The VM 106 also runs conventional applications 109, such as word processors, spreadsheets and other end-user applications. Multiple guest VMs and multiple MVMs may be run on each node. The MVM 105, the guest VM 106 and the management hardware 103 also include the CIMOMs 110-112, respectively.

In today's systems, individual management entities, which may include management software in a VM or an MVM, operate within separate isolated environments and are non-coordinated among each other. For example, the individual management entities may be performing the same or different functions. The management entities, for example, may be performing inventory functions, power management at different levels, service level agreement (SLA) management, etc. In either case, the management entities may not be coordinated and in some cases cannot be coordinated because of lack of privileges, inability to communicate with different management entities, and inability to process information from other management entities. This leads to reduced management functionality and potential in-efficiency.

According to an embodiment, M-channels and management brokers (M-brokers), including CIMOM registry brokers, are used to coordinate among different management entities. Management entities in the embodiments may include the administrative and management software 107 in the MVM 105, the management software 108 in the guest VM 106, the management hardware 103 including firmware, CIMOMs 110-112, agents and CIMOM registry brokers. These entities may perform different and/or the same or similar functions. M-channels provide bi-directional information exchange among the hardware 102 and 103, VMs 106 and 107, and management software 107 and 108 and applications 109 and CIMOMs 110-112. The CIMOM registry brokers provide a framework for implementing coordination policies and leveraging information provided through M-channels.

Figure 2:
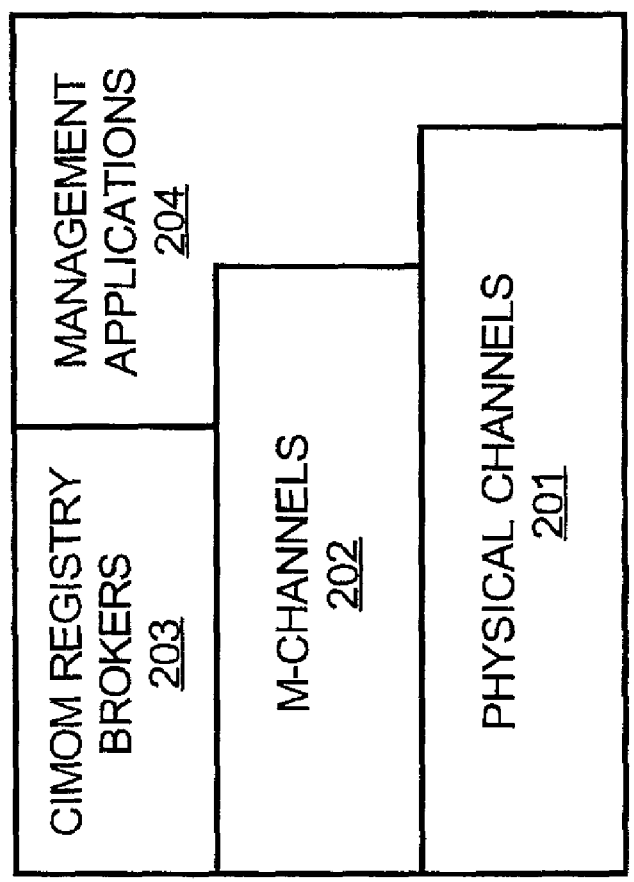
FIG. 2 illustrates a coordination stack with M-brokers and M-channels, according to an embodiment.

FIG. 2 shows the deployment stack with M-channels and CIMOM registry brokers. As shown in FIG. 2, M-channels 202 are built on top of existing physical channels 201, such as shared memory channels, sockets, and TCP/IP channels. CIMOM registry brokers 203 use the M-channels 202 for communication and execution of coordination policies. The CIMOM registry brokers 203 interact closely with existing management applications and enhance their functionality. The M-channels 202 and the CIMOM registry brokers 203 do not prescribe how management tasks are carried out. This permits applications to either use one CIMOM registry brokers servicing multiple platforms or use distributed implementations where multiple CIMOM registry broker instantiations cooperate to manage VMs and other tasks. Similarly, the M-channels 202 may carry simple monitoring data, like system provided information about current CPU usage, or they could be used for rich data and control exchanges between VMs and the management hardware and/or management software. In addition to the CIMOM registry brokers 203, management agents (referred to as M-agents or agents) are also used to communicate information on the M-channels 202. The M-agents are described below. The management applications 204 perform the management tasks for the node, and may include the application and management software 107 on the MVM 108, management software 108 or applications 109 on the guest VM 106 or firmware on the management hardware 103.

Figure 3A:
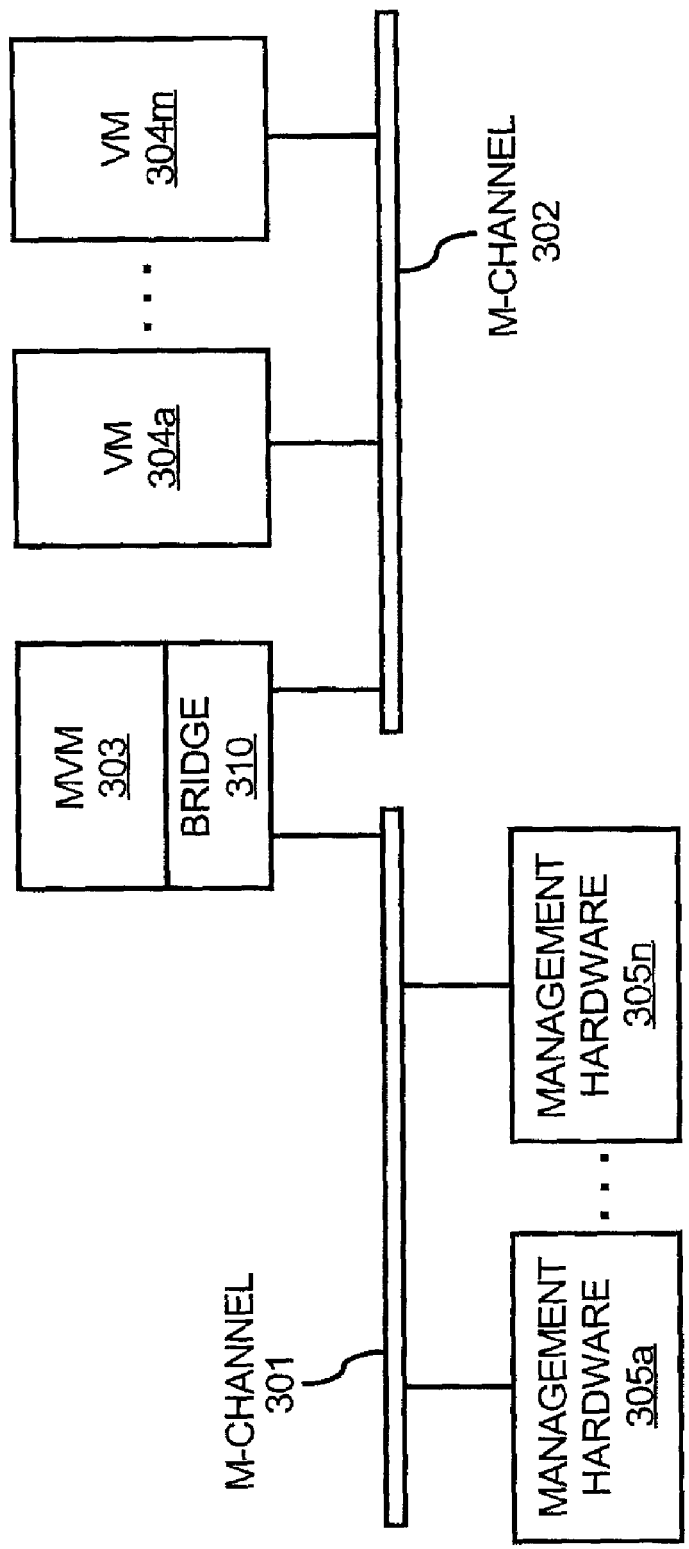
FIGS. 3A-B illustrate M-channels in a single system and in a distributed system, according to embodiments.
Figure 3B:
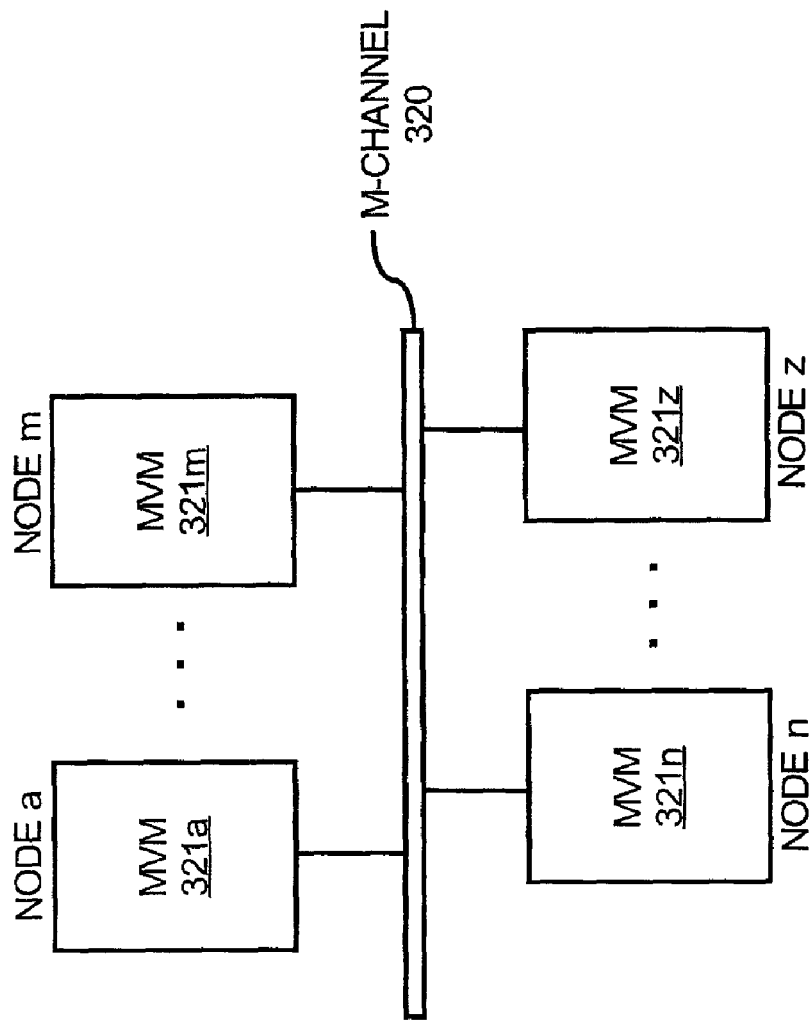

The M-channels 202 are special inter-VM and intra-VM communication channels which transfer commands and information between the MVM 107 and other VMs, such as the guest VM 106, as well as between the MVM 107 and the management hardware 103. The M-channels 202 can be instantiated in a single system and in a distributed system context. FIGS. 3A-B illustrate the M-channels 202 in a single system, such as in a node, and the M-channels 202 in a distributed system, such as channels between nodes.

As shown in FIG. 3A, M-channels 301 and 302 are used in a single system, such as in a node. The M-channels 301 and 302 are used for communication among VMs, including VMs 304a-m and the MVM 303 and for communication between the management hardware 305 and the VMs. The VMs 304a-m may include guest VMs managed by the MVM 303. The management hardware 305 may include components 305a-n, such as management processors, sensors and storage controllers.

The M-channels also include a communication bridge 310 that redirects messages from one M-channel to the other according to a set of policies. The redirection is transparent to the sending and receiving management entities. The bridge 310 may be instantiated in an MVM, such as shown in FIG. 3A. The bridge 310 is operable to perform protocol conversion when forwarding messages to the receiving management entity. For example, the bridge 310 puts messages from the VMs 304a-m or the MVM 303 in a format understood by a management processor in the management hardware 305 and vice versa. Also, the bridge 310 may implement trust policies. For example, trust policies may define which of the VMs 304a-m and MVM 303 are allowed to communicate with the management hardware 305 to prevent malicious VMs from causing failures in the node. Also, the bridge 310 may perform flow control to maintain a predetermined quality of service (QoS). For example, the management processor may be able to process messages at a predetermined rate. In certain situations there may be a high rate of interactions between VMs and management hardware, such as when monitoring for failures. The bridge 310 may cache messages being sent to a management processor to accommodate the message processing rate of the management processor.

FIG. 3B illustrates an M-channel 320 in a distributed system. The M-channel 320 is used for exchanging information among the MVMs 321a-n in nodes a-z. FIGS. 1-3B show components within a system, and the system may be hierarchically managed in a peer fashion through nodes 101a-n. The described architecture, however, works equally well for other environments, such as when you have multiple systems managed with system aggregators.

In either a single system or in a distributed system, the M-channels may be bi-directional and can be used for exchanging both control information and actual data. For VM migration, the M-channels may support dynamic disconnection and reconnection between VMs and MVMs. Also, for flexibility, the M-channels may deliver messages using both point-to-point and broadcast or multicast protocols. Similarly, delivery of messages can be synchronous or asynchronous depending on the application being supported. Asynchronous messaging may be used when streaming monitoring data on a continuous basis. The underlying physical channels for the M-channels may be physical channels already existing in the system.

Challenges in realizing M-channels are caused by their use in different settings and for different management strategies. For instance, since M-channels must continue to operate even when VMs migrate between different computing platforms, they must be capable of using message-based data transports. At the same time, potentially high rate interactions between VMs and management hardware when monitoring for failures in reliability management require an implementation enabling substantial data exchanges between VMs and MVMs. Thus, the M-channels may be implemented using multiple methods.

M-channels between MVMs and management hardware can be implemented by using a device driver in an MVM which handles the particular management hardware and exports device specific interfaces to M-brokers. The M-channels between VMs and MVMs may be implemented using MVM-provided inter-domain communication channels. These channels typically use shared memory communication with very good latency characteristics that could enable management applications to react quickly to various notifications. In another example, the M-channels can be implemented over the network, for example, using socket application program interfaces (APIs)). This is also an explicit communication channel and hence a generic solution to be used with management agents. This solution, however, has higher latency compared to shared memory communication. This solution, however, enables M-channels to span multiple physical machines creating M-channels between MVMs running on different nodes. M-channels may also be provided between management hardware components, and can be built on top of the Intelligent Platform Management Interface (IPMI) standard.

Table 1 below shows a list of APIs that may be used by M-channels to communicate between VMs, including communication between MVMs and VMs over a shared memory channel. These APIs may also be used to communicate between management hardware and MVMs. The APIs are divided into the phases of discovery, connection establishment, message communication, and connection termination.

TABLE 1

M-Channel APIs

| API | Return Value |
|---|---|
| discover(app_name) | List of agents ids {ids} |
| wait_on_discover(app_name component_id) | The broker id-broker_id |
| open(id,DELIVERY_TYPE, PHY_CHANNEL) | Connection descriptor-conn_desc |
| open_bcast(PHY_CHANNEL) | Connection descriptor-conn_desc |
| Open_mcast(MCAST_GROUP{ids},, PHY_CHANNEL) | Connection descriptor-conn_desc |
| send(conn_dec, msg_type,msg) | non-blocking send, is success or failure return |
| receive(conn_dec, msg_type,msg) | Blocking receive into msg, is successor failure return |
| close(conn_desc) | Success or failure |

As described above, CIMOM registry brokers coordinate information from management entities. For example, coordination is between management hardware and management applications (e.g., software 107, 108 and 109 shown in FIG. 1), as well as across VMs. A given system may have several CIMOM registry brokers. A CIMOM registry broker may be provided for each management application, which may include a management application running on an MVM or a guest VM. Furthermore, CIMOM registry brokers may be provided on management hardware. The CIMOM registry brokers may also provide a bridge, such as the bridge 310 shown in FIG. 3A, allowing communication between management hardware and management applications.

The CIMOM registry broker and M-agents, which are described below, may be implemented as software stored on a computer readable medium and executed by hardware. The CIMOM registry brokers and M-agents may be application-specific and may be implemented in the kernel level as well as the user level. In one embodiment, the CIMOM registry brokers and M-agents are implemented as multi-threaded applications. The actual management application-specific broker code is implemented as a thread in the application. The CIMOM registry brokers and M-agents are multi-threaded because they communicate with multiple entities which usually operate independent of each other (e.g., management hardware, policy maker, M-channel, etc.). Different threads of the CIMOM registry broker handle the communication with other VMs, management hardware and decision making algorithms. These CIMOM registry brokers communicate with other M-agents and CIMOM registry brokers on local machines using shared memory M-channels and with CIMOM registry brokers on other machines using socket-based M-channels. To access the management hardware, an CIMOM registry broker may utilize a driver-provided M-channel interface to read from and write to the device. The CIMOM registry broker's interface to M-channels may also operate as the communication bridge 310 of FIG. 3A between the VMs and the management hardware. In this case, all the accesses to the management hardware from VMs must go through the CIMOM registry broker.

Figure 4:
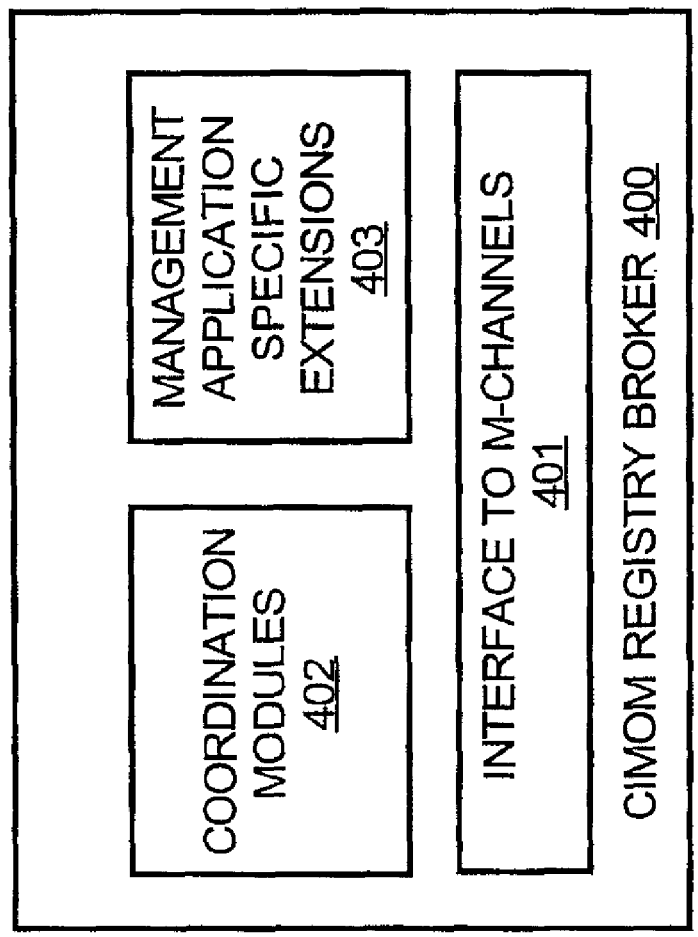
FIG. 4 illustrates an M-broker, according to an embodiment.

FIG. 4 shows the structure of an CIMOM registry broker 400, according to an embodiment. The structure of the CIMOM registry broker 400 shown in FIG. 4 may be used as a model for systematic development of CIMOM registry brokers. The CIMOM registry broker 400 includes an interface 401 to the M-channels, coordination modules 402, management application specific extensions 403 and a policy interface 404. The interface 401 may include the M-channel APIs shown in table 1. The interface 401 allows the CIMOM registry broker 400 to communicate with other CIMOM registry brokers and M-agents on the M-channels. The coordination modules 402 include protocols for message exchange between CIMOM registry brokers and M-agents. In addition, the coordination modules 402 along with the extension modules 403 execute discovery, registration, call re-direction and update phases.

Some core coordination modules may implement the basic protocol for communication among the CIMOM registry brokers and the M-agents. Also, the coordination modules 402 may be reused by all CIMOM registry brokers for different management applications. The extensions 403 may include APIs for specific applications.

Closely tied with CIMOM registry brokers are M-agents. An M-agent is software that interacts with existing management applications and serves as a proxy for sending management information to other M-agents and CIMOM registry brokers. Unlike CIMOM registry brokers, however, an M-agent does not execute any coordination modules. As such, the M-agent is responsible for monitoring, and exchanging information via the M-channels.

Figure 5A:
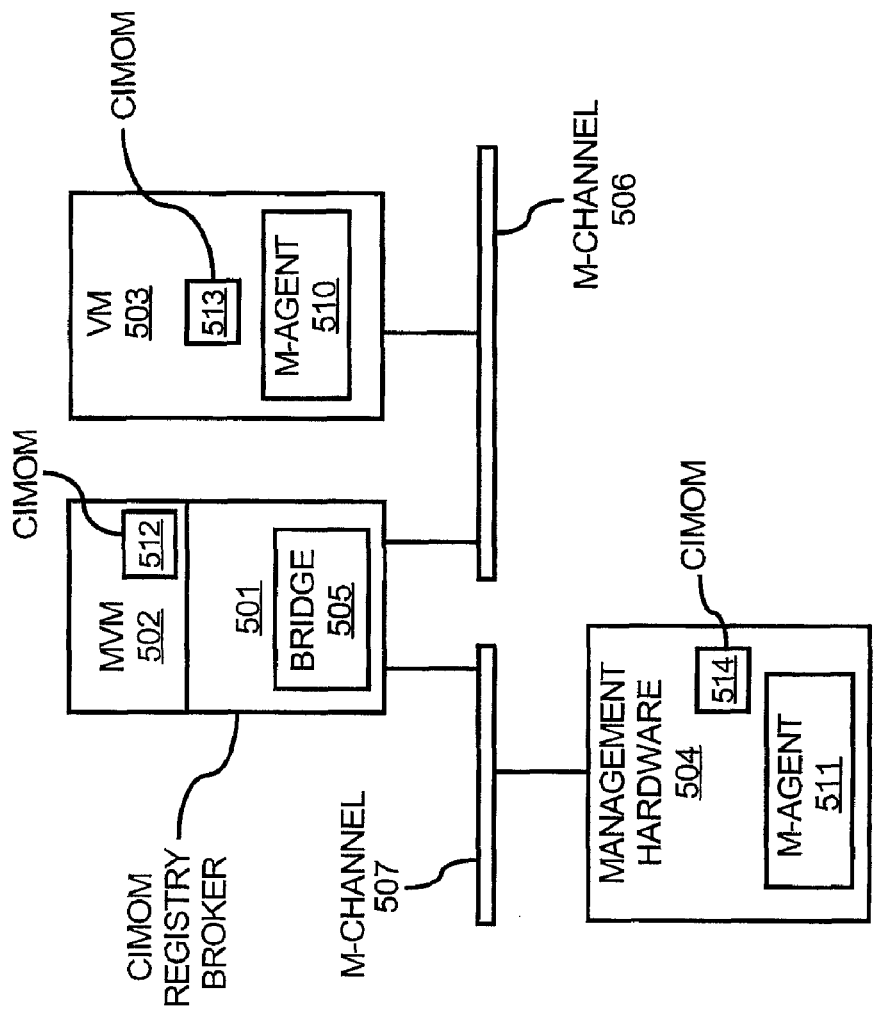
FIGS. 5A-C illustrate different deployment strategies for M-brokers, according to embodiments.
Figure 5B:
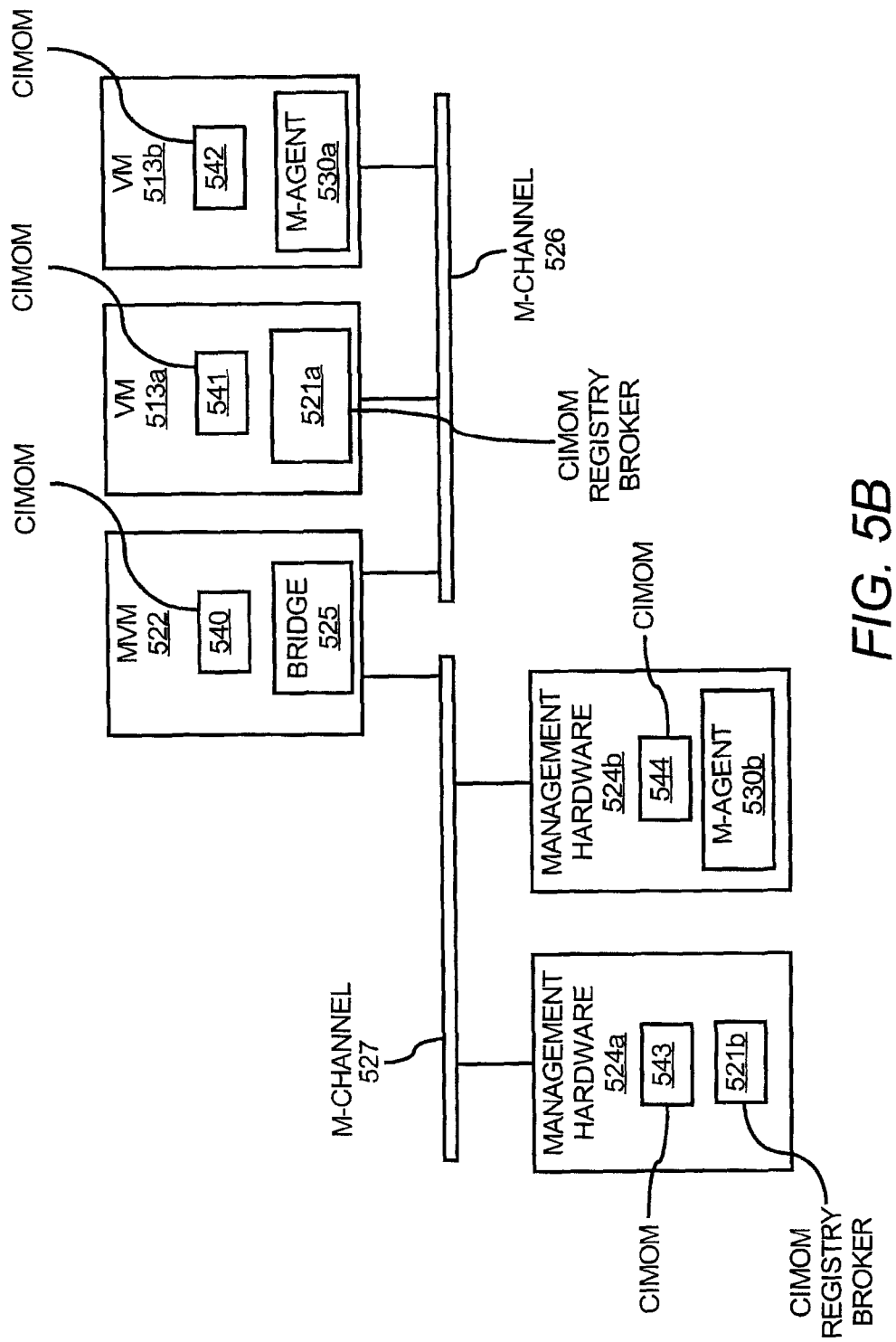
Figure 5C:
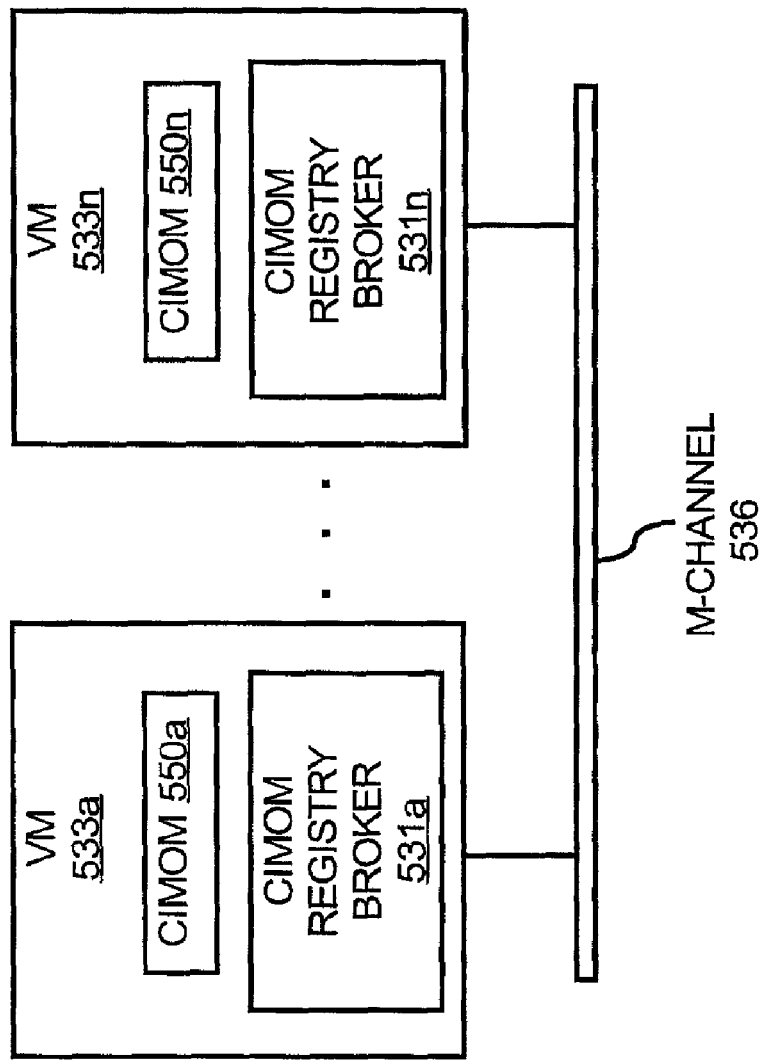

CIMOM registry brokers can be instantiated with different deployment strategies. FIGS. 5A-C illustrate embodiments for deploying CIMOM registry brokers in a single system and a distributed system. FIG. 5A shows an CIMOM registry broker 501 in a single system providing a communication bridge 505, e.g., which may be the same as the communication bridge 310 shown in FIG. 3. The CIMOM registry broker 501 is in an MVM 502 and communicates with M-agents 510 and 511 in the VM 503 and the management hardware 504 respectively via M-channels 506 and 507. The CIMOM registry broker 501 provides coordination between firmware in the management hardware 504 and management applications in the MVM 502 and the VM 503.

FIG. 5B shows an CIMOM registry broker 521a residing in a VM 513a and an CIMOM registry broker 521b residing at the management hardware 524a. In this case, the CIMOM registry brokers 521a-b provide coordination polices that are implemented at the management hardware 524a and management applications at the VM 513a. Another VM 513b may include an M-agent 530a, and another hardware component 524b of the management hardware may include an M-agent 530b. An MVM 522 includes a communication bridge 525 for providing bi-directional communication on the M-channels 526 and 527 between the management hardware 524a-b and the MVM 522 and the VMs 513a-b. FIG. 5B may represent components in a single node. Also, FIG. 5B shows an CIMOM registry broker in management hardware and a guest VM. However, an CIMOM registry broker may only be provided in management hardware, may only be provided in one or more guest VMS, or may be provided in both management hardware and a guest VM. In addition, as shown in FIG. 5A, the CIMOM registry broker may be provided only in an MVM. Also, the CIMOM registry broker(s) may be provided in any combination of an MVM and one or more of management hardware and a guest VM.

FIG. 5C shows a system where CIMOM registry brokers 531a-n are distributed across VMs 533a-n. The VMs 533a-n may be in a single node or distributed across multiple nodes. The M-channel 536 may include one or more M-channels for a distributed system and/or a single system. The CIMOM registry brokers 531a-n communicate and jointly make coordination decisions based on stored coordination policies.

In FIGS. 5A-C, the CIMOM registry brokers and M-agents periodically exchange messages for purposes of coordination. As mentioned above, these messages are exchanged using M-channels. A well-defined application-level protocol may be used by the CIMOM registry brokers and the M-agents to perform information exchange, coordination, and actuation.

The addressing among the CIMOM registry brokers and the M-agents takes place using a unique identifier associated with each of them, according to an embodiment. The addressing applies to both hardware and software components, and uniquely identifies components over a distributed system. The identifier comprises a tuple <Component ID, App ID> as the identifier. For the M-agent or the CIMOM registry broker in the hardware component, <Component ID> may correspond to the machine serial number. For the M-agent or CIMOM registry broker in a VM, <Component ID> may correspond to the <MVM IP, VM ID> where the MVM IP is the IP address of the MVM and the VM ID is the unique virtual machine ID assigned by the MVM to the VMs in the system including itself. App ID is the unique name given to a management application (e.g., power management, backup storage management, inventory management, etc.) for which coordination is being performed. The App ID may be uniquely assigned by a system administrator.

Figure 6:
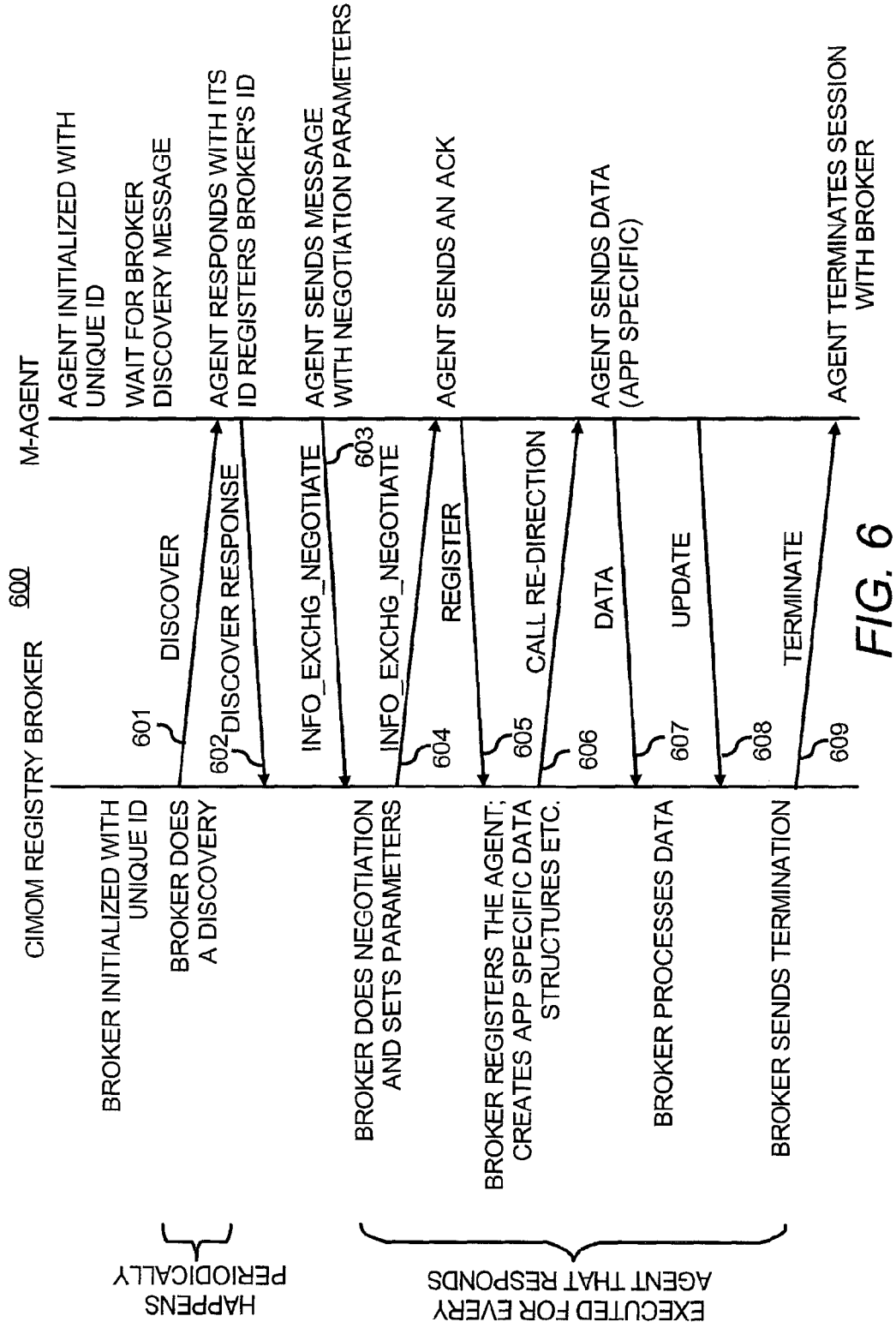
FIG. 6 illustrates message exchanges between a CIMOM registry broker and an M-agent, according to an embodiment.
Figure 7:
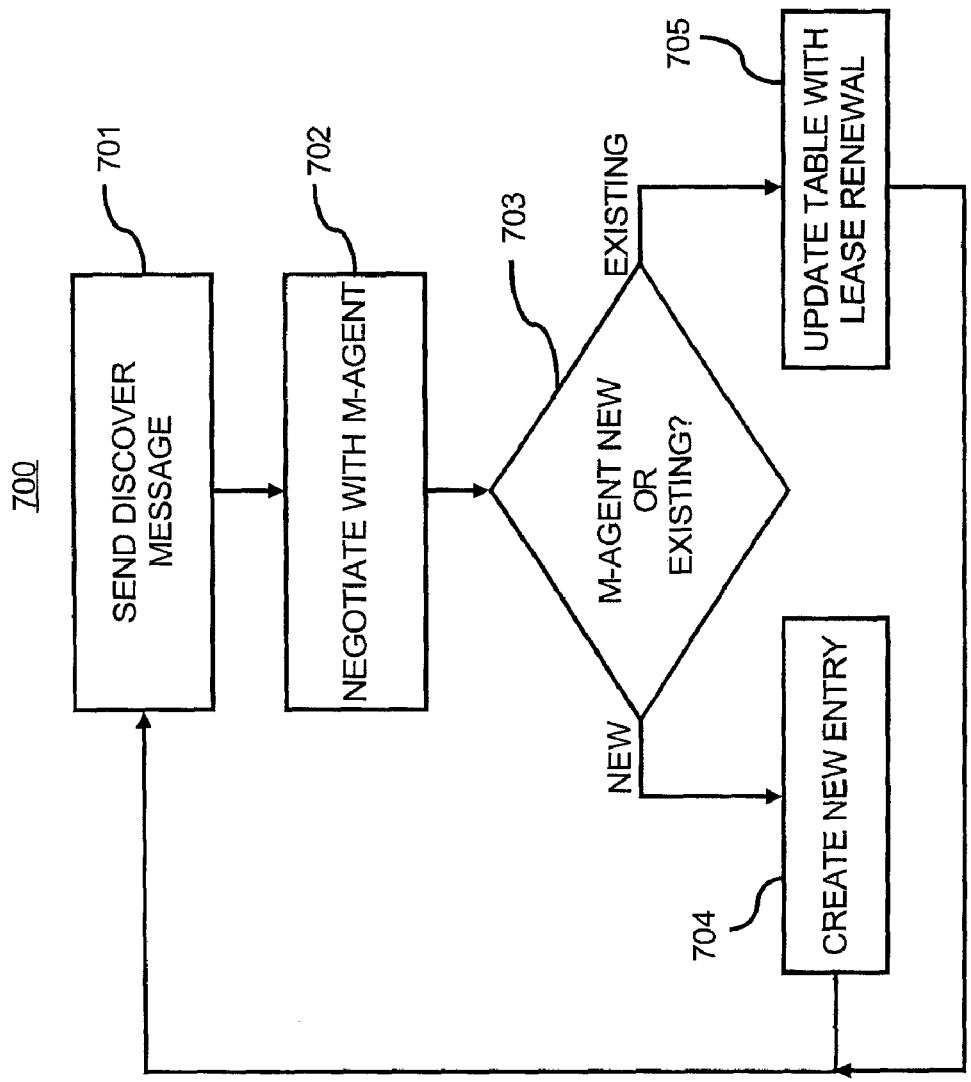
FIG. 7 illustrates a flow chart of a method for a discovery phase, according to an embodiment.

FIG. 6 shows an example of a timeline of message exchanges 600 between a CIMOM registry broker and an M-agent, according to an embodiment. The messages in FIG.

6 are annotated with the message types and illustrate the control commands that may be used for the message type field in M-channel APIs.

The messaging in FIG. 6 may be applied between CIMOM registry brokers, between M-agents, as well as between CIMOM registry brokers and M-agents. The messaging in FIG. 6 includes message exchanges for four main phases including a discovery, registration, call re-direction and update phases. During these phases, the CIMOM registry broker discovers M-agents and receives and stores registration information for CIMOMs using the M-agents. The registration information is associated with objects hosted at the plurality of CIMOMs. The CIMOM registry broker may receive a request from an entity external to the system. The request may include a request for inventory, such as information about assets meeting certain criteria. The CIMOM registry broker is operable to search registration information in a registration table for information relevant to the request, and request the relevant information from CIMOMs hosting the information. The CIMOM registry broker is operable to correlate information from multiple CIMOMs, and send the correlated information to the external entity. A further overview of the discovery, registration, call re-direction and update phases and a detailed description of each phase is described below.

As shown in FIG. 6, in the discovery phase, the CIMOM registry broker initiates with a DISCOVER message 601, and the M-agent responds with a DISCOVER RESPONSE message 602 containing the agent id. Subsequently, the M-agent and the CIMOM registry broker go through a negotiation (messages 603-604), and if the M-agent satisfies the criteria that the CIMOM registry broker is looking for, the parameters specified by the M-agent are registered by the CIMOM registry broker (message 605).

According to an embodiment, the CIMOM registry broker is the single point of contact to the external users, hence, when an external request is received by the CIMOM registry broker, it does a call-redirection to the appropriate M-agents based on the registration information that it has (message 606). Once the results are received from the M-agents (message 607), they are correlated and provided to the requesting client.

At any later point, certain classes may be deleted or added at the individual CIMOMs prompting an update of the registration contents at the CIMOM registry broker. Whenever such a change is detected, the M-agent sends an UPDATE message 608 to the broker. Finally, when the CIMOM registry broker is no longer interested in a CIMOM, it sends a TERMINATE message 609 and all registration details for that CIMOM are removed from the CIMOM registry broker.

Details of the discovery phase, the registration phase, the call re-direction phase, and the update phase are as follows. Discovery is initiated by the CIMOM registry broker, which periodically sends out a DISCOVER message and new M-agents that have not yet registered with this CIMOM registry broker respond with a DISCOVERY_RESPONSE message. M-agents that are already registered will also respond with a LEASE_RENEWAL message. A lease-based approach to registering M-agents is provided. For example, if an already registered M-agent does not respond to a DISCOVER message for a fixed number of rounds (e.g., 3), it is assumed the corresponding CIMOM has been removed from the system and the M-agent is de-registered. On the other hand, if a new CIMOM has been dynamically added to the system, it would be detected in the next round of the DISCOVER message broadcast on M-channels. Such a design provides support for dynamism in the system. Note that the CIMOM registry broker can also explicitly terminate the registration of a CIMOM by sending the TERMINATE message to the corresponding M-agent.

A method 700 for the discovery phase includes the CIMOM registry broker sending a DISCOVER message to agents at step 701. The CIMOM registry broker may broadcast the DISCOVER message on M-channels.

At step 702, for every responding M-agent, the CIMOM registry broker negotiates with the M-agent. Each M-agent is associated with a CIMOM.

At step 703, if the negotiation is successful, the CIMOM registry broker determines if the M-agent is a new agent or an existing M-agent.

If the M-agent is a new agent, a new entry for the corresponding CIMOM is created in a registration table at step 704. The entry may include a softlink describing the location of the CIMOM, any namespaces hosted by the CIMOM and any classes in the namespaces.

If the M-agent is an existing M-agent that was previously registered, the registration table is updated to indicate a new lease renewal at step 705. For example, an existing M-agent responds to the DISCOVER message with a LEASE_RENEWAL message. After verification of credentials, the CIMOM registry broker updates the registration table with a lease renewal for the M-agent. If the M-agent does not respond to multiple subsequent DISCOVER messages from the CIMOM registry, then it may be removed from the table. Steps 701-705 may be repeated periodically, such as every T second.

Figure 8:
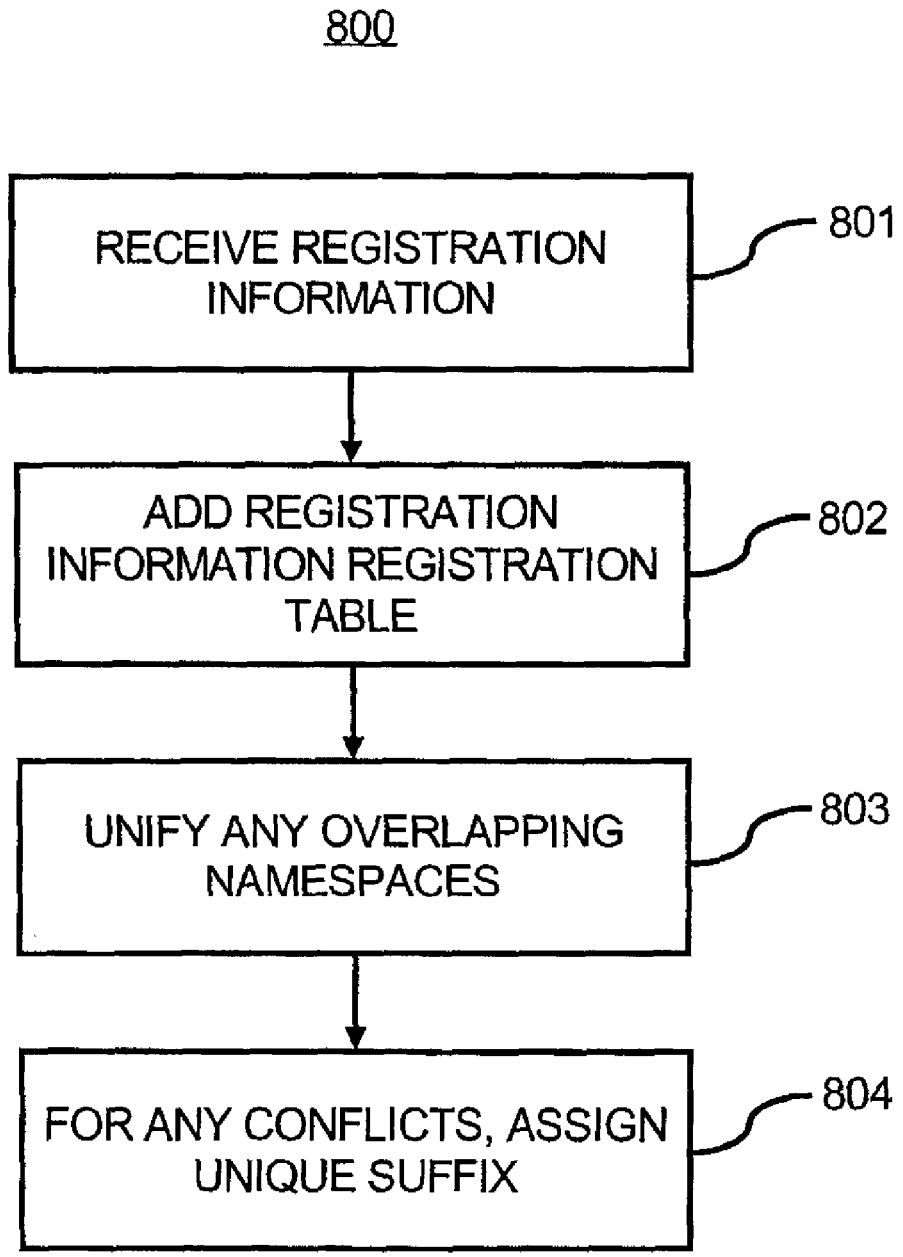
FIG. 8 illustrates a flow chart of a method for a registration phase, according to an embodiment.

After the discovery phase, the CIMOM registry broker participates in the registration phase for new CIMOMs. FIG. 8 illustrates a method 800 for the registration phase. At step 801, the CIMOM registry broker receives registration information from the M-agent for the new CIMOM.

At step 802, the CIMOM registry broker adds the information to the newly created entry for the CIMOM in the registration table. The registration information received from the M-agent for the CIMOM may include any namespaces hosted by the CIMOM and classes in the namespaces. The CIMOM registry broker creates new soft links for every class defined in the registering namespace. The soft link has the location/URL of the CIMOM, the name of the namespace and the class, such as <location-<RL>//<namespace>/<classname>.

At step 803, in cases where there are overlapping namespaces, the classes are unified with the existing namespace at the CIMOM registry broker.

At step 804, for conflicts, a suffix is assigned to the softlink with the numbering based on the arrival order. This implies an implicit priority ordering that can be used during call redirection phase. A conflict may arise for classes with the same name. It should be noted that in some CIMOMs, it may be easier to add a prefix than a suffix. A suffix or prefix can be used symmetrically and would be instantiation specific.

Figure 9:
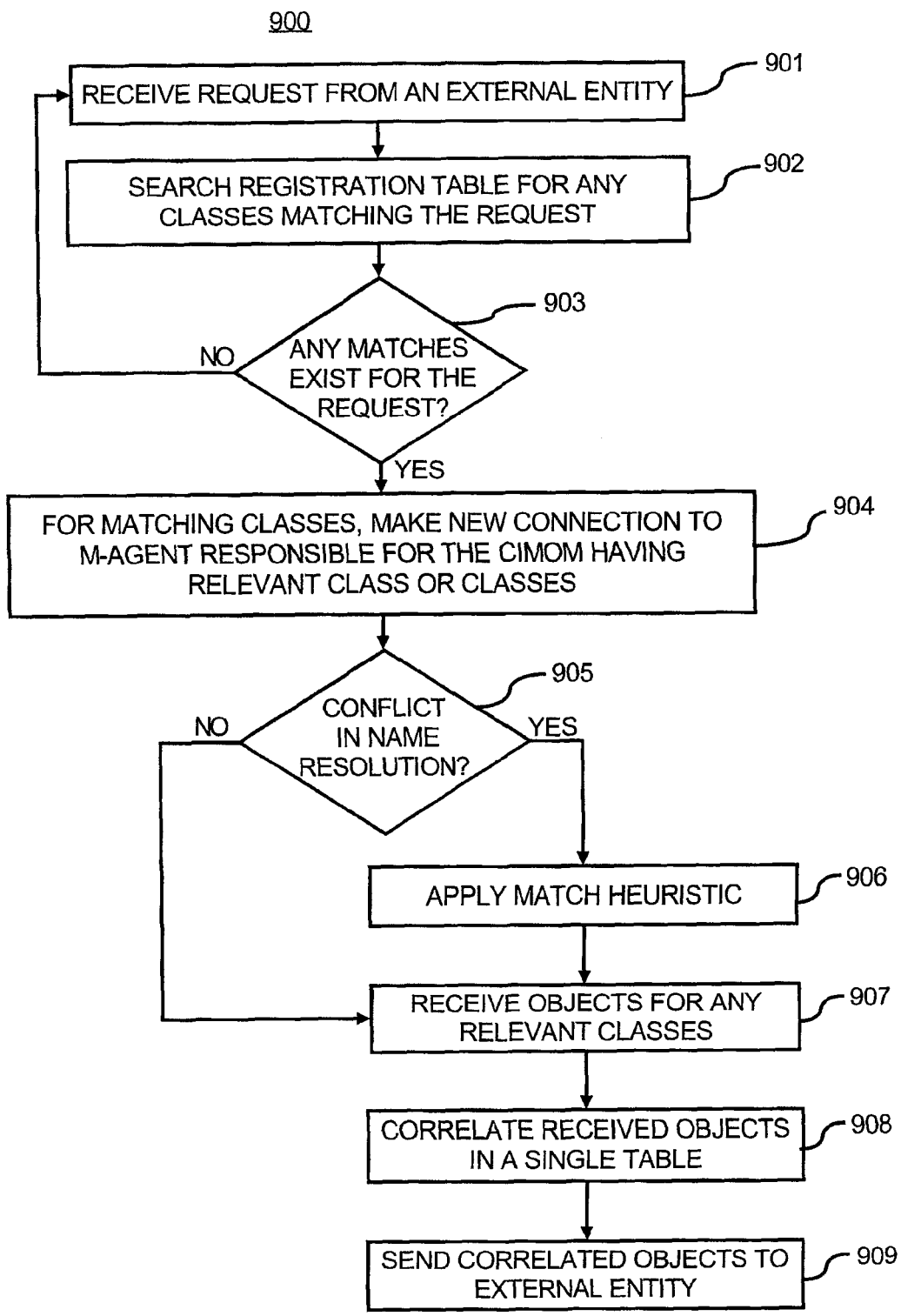
FIG. 9 illustrates a flow chart of a method for a call redirection phase, according to an embodiment.

In the call redirection phase, the CIMOM registry broker is operable to gather information from a plurality of CIMOMs in response to a request from an entity external to the system. FIG. 9 illustrates a method 900 for the call redirection phase.

At step 901, the CIMOM registry broker receives a request from an external entity. For example, the CIMOMs may be provided on a server, and the CIMOM registry broker receives a request for inventory information from a remote, central, management application.

At step 902, the CIMOM registry broker searches the registration table for a class corresponding to the request.

At step 903, the CIMOM registry broker determines whether there are any matches for the request, i.e., whether there are any classes relevant to the request. Match determination may be based on matching request terms with class names. Classes are provided in the softlinks in the registration table.

At step 904, if relevant classes are identified, a new connection is made to the M-agent responsible for the CIMOM having the relevant class or classes.

At step 905, the CIMOM registry broker determines whether there is a conflict in name resolution. For example, a request may include a request for objects in a certain class. Multiple entries may exist in the registration table under the same namespace with the same class name but different suffixes, such as described at step 804. Then, a match heuristic is applied at step 906. For example, one of the following match heuristics may be applied at step 906 to select one of the classes: first match, priority match, and user-driven match.

For first match, the class that matches first is used. This essentially delegates the conflict resolution to the manner in which the name resolution is implemented in the CIMOM. For priority match, the implicit ordering of the classes (encapsulated at the suffix) is used to resolve conflicts. For example, the lower the suffix number, the higher the priority is given to the class as a match. For user-driven match, all matches (i.e., class names or objects) are sent to the end-user/client/external entity, and let the user decide which is the best match. Automation could be provided for this heuristic by asking the user to specify certain requirements/context and designing an algorithm that tries to find the best match for the user.

At step 907, the CIMOM registry broker receives objects for any relevant classes from the CIMOMs via the M-agents and the M-channel(s) connecting the M-agents and the CIMOM registry broker. Note that a request from the external entity may require multiple call re-directions. For example, classes at different CIMOMs are relevant to the request and steps 903-907 are performed to retrieve relevant objects from different CIMOMs.

At step 908, the CIMOM registry broker correlates the received objects in a single table. For example, objects are received for different classes from multiple CIMOMs. A single table is created with all the objects.

At step 909, the CIMOM registry broker sends the correlated objects to the external entity. For example, the single table is sent to the external entity, which may be a centralized management application in a data center.

The correlation performed at step 908 is beneficial to system administrators because its saves them a significant amount of time. For example, the request from the external entity may be an inventory request from a remote, centralized management application in a data center. Conventionally, each CIMOM would communicate directly with the management application, and the system administrator is responsible for determining which objects are associated with which request. Also, it is difficult to get a single unified view of the objects to make administrative decisions, such as decisions to upgrade hardware (e.g., memory) benefit from knowing what applications are being hosted on the server. Hardware fault diagnostics decisions would benefit from knowing what applications are being affected, and knowledge of the physical platforms on which the hypervisors and VMs reside would aid in better license tracking. Correlating the hypervisor inventory information with those for the set of VMs hosted on it would aid in better statistics gathering, and correlating the per-VM inventory information with that on the hypervisor would help in better accountability and licensing.

Step 908 provides correlation of the data and provides a single unified view of the objects, allowing system administrators to more easily and quickly make these decisions. FIGS. 10A and 10B show tables that demonstrate the value of a coordinated inventory management solution. FIG. 10A shows the individual inventory tables for hardware, hypervisor, and guest VMs. Typically, the inventory information in these tables would be received separately from each CIMOM. FIG. 10B shows the unified table with all of the inventory information correlated, where the correlation may be performed by the CIMOM registry broker at step 908. As seen in FIG. 10A, there aren't common attributes across the individual inventory tables, so it would be very difficult to link the information to form a table by a management application receiving the information piece-meal. FIG. 10 gives a unified picture, and the information for individual components or objects may be highlighted differently as a visual aid for the system administrator to quickly discern information for different objects. This information can now be used for better unified management in the data center.

In the update phase, the CIMOM registry broker updates entries in the registration table for classes based on updates to the classes or namespaces hosted by the CIMOMs in the system. For example, corresponding M-agents for CIMOMs send UPDATE requests to the CIMOM registry broker, and the CIMOM registry broker makes the appropriate updates. In the case of new classes or namespaces being added, the CIMOM registry broker repeats the same operation as was done during registration phase. In the case of deletions, however, instead of removing the existing softlinks from the registry, the CIMOM registry broker creates "white-outs", i.e., dead links informing the requestor that the object has been deleted. These whiteouts help in keeping history of deleted objects and preventing unexpected errors in cases where the meta-data information has been cached by certain clients.

Figure 11:
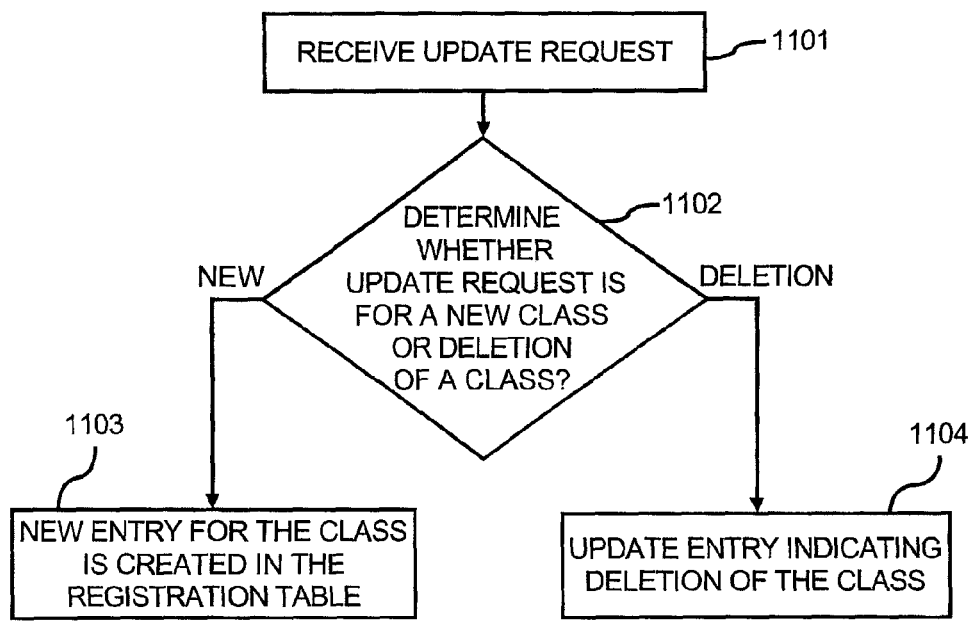
FIG. 11 illustrates a flow chart of a method for an update phase, according to an embodiment.

FIG. 11 illustrates a method 1100 for the update phase. At step 1101, the CIMOM registry broker receives and UPDATE request from a CIMOM.

At step 1102, the CIMOM registry broker determines whether the UPDATE request is for a new class or deletion of a class.

At step 1103, if the UPDATE request is for a new class, then a new entry for the class is created in the registration table, such as described with respect to step 704 in the registration phase.

At step 1104, if the UPDATE request is for deletion of a class, then the softlink in the registration table for the class is updated with a whiteout indicating deletion of the class. For example, the new URL in the softlink now becomes: localhost//null_object where the null object has been defined to give a standard error message "Object deleted". Optionally, the time when the object was deleted is stored as metadata.

Figure 12:
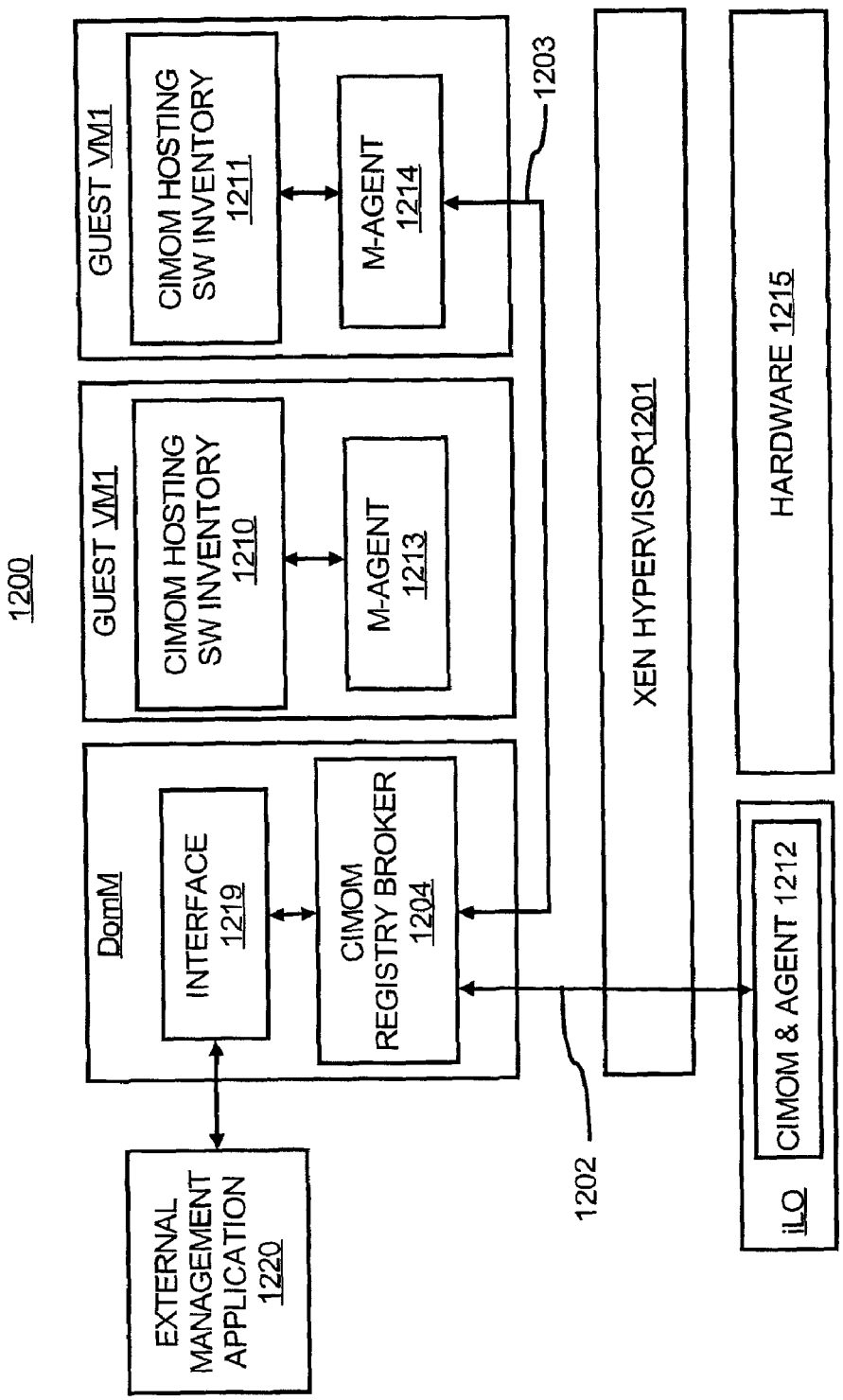
FIG. 12 illustrates an implementation of a system, according to an embodiment.
Figure 13:
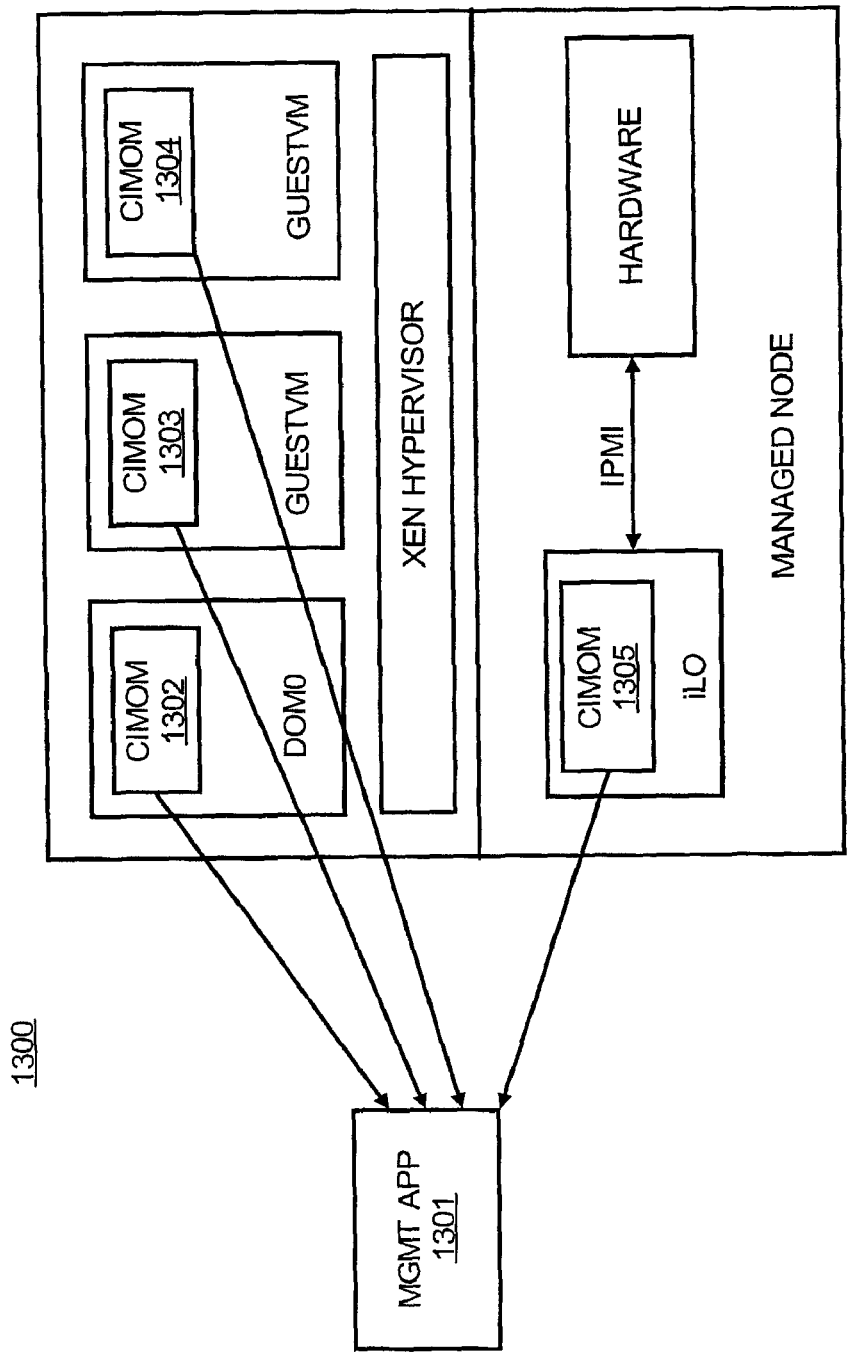
FIG. 13 illustrates a conventional system for sending data to an external management application, according to an embodiment.

FIG. 12 shows an implementation 1200 of a system with a CIMOM registry broker in an MVM, CIMOMs and corresponding M-agents in guests VMs and management hardware and M-channels providing communication channels between the CIMOM registry broker and the M-agents. The implementation shown in FIG. 12 is a Xen implementation. That is Xen is used as the virtualization layer, shown as Xen hypervisor 1204. It will be apparent to one of ordinary skill in the art that other virtualization layers may be used.

FIG. 12 shows the Xen hypervisor 1204, M-channels 1202 and 1203, a CIMOM registry broker 1201 in DomM, which is the MVM. Guest VMs 1 and 2 include CIMOMs 1210 and 1212, respectively, hosting objects for software inventory. M-agents 1213 and 1214 are for the CIMOMs 1210 and 1212, respectively, and each of the M-agents 1213 and 1214 communicates with the CIMOM registry broker 1201 via the M-channel 1203 during the different phases described above, for example, to provide information for software inventory. Management hardware, shown as iLO, includes a CIMOM and M-agent shown as 1212. The CIMOM and M-agent 1212 communicates hardware inventory information to the CIMOM registry broker 1204 during the different phases via the M-channel 1202. the CIMOM registry broker 1204 in DomM communicates inventory information and receives requests from an external management application 1220 via interface 1219.

In the system 1200, inventory information is captured as CIM objects, and the CIMOMs 1210-1212 serve these objects via the M-agents. The objects, for example, describe the software applications running on the guest VMs 1 and 2 and the hardware 1215. Specific examples of inventory information in objects include those relating to processor & peripherals configuration, applications hosted, system software & middleware stack, as well as monitoring sensors installed at the servers. OpenWBEM may be used as the CIM-based infrastructure for the objects and the CIMOMs.

The M-channels 1202 and 1203 may comprise sockets and/or shared memory. CIMOMs 1210-1212 use the M-channels 1202 and 1203 to inform the CIMOM registry broker 1204 of the inventory objects served by them during the registration and update phases. Note that this is meta-data relating to inventory information hosted by the CIMOM as objects. External users and management applications can now rely on the inventory registry broker as the single point of access to obtain inventory information.

M-channels implemented as sockets provide an explicit communication channel and hence a generic solution to be used with M-agents. It also enables M-channels to span multiple physical machines creating M-channels between MVMs running on different platforms. These M-channels, however, have higher latency compared to shared memory communication. In this second implementation using shared memory, the M-channel 1202 between DomM and the iLO is implemented by using a device driver in DomM which handles the ILO hardware and exports device specific interfaces. The M-channel 1203 between the guest VMs 1 and 2 and DomM is implemented using driver modules. A management frontend (FE) driver module runs inside the guest VMs 1 and 2, which communicates with a management backend (BE) module inside DomM. FE and BE represent the M-channel endpoints for the guest VMs 1 and 2 and DomM respectively. The communication is asynchronous and hence uses two different communication rings for the two directions (send and receive). When the FE loads, it allocates pages for the two rings and shares with the BE. Both FE and BE export a file interface (e.g. /dev/mgmt in Dom0) to user-level brokers and applications and an API interface to broker and agents running in kernel level and provides a standard set of APIs. If the sent or received data size if more than the ring element size, the data is passed by sharing the page containing the data and passing pointers to it. A typical M-channel ring data element consists of three fields; an M-channel header, followed by an application specific header and followed by application specific data if any. This provides a generic, simple and yet flexible infrastructure for transferring management related messages between VMs. An M-channel communication bridge (MCB) between the various FEs and the BE are implemented as part of the BE which route messages based on the address contained in the M-channel header. Similarly a bridge between the VMs and the iLO is implemented as part of the CIMOM registry broker 1204 inside DomM which routes messages between them according to its policies (e.g. passthough vs. virtualized access).

The CIMOM registry broker 1204 provides a single client-facing interface to simplify administrator access to objects. For inventory management, all of the inventory M-agents at guest VMs, firmware, and Dom0 register themselves with the CIMOM registry broker 1204. On receiving a request, CIMOM registry broker 1204 acts as a proxy and re-directs the request to one or more of the M-agents at the guest VMs, at the Dom0, and at the management hardware. The communication takes place using M-channels. On receiving the results from the M-agents, the CIMOM registry broker 1204 does correlation and unification of data as needed before sending it to the client. The unification takes place through the merger of the contents of CIM objects.

For the registration, the M-agents at the individual CIMOMs create a "special link CIM object" (i.e., the softlink) for every registering class. This "special link CIM object" specifies the URL including the IP address of the CIMOM at where the class can be found. The CIMOM registry broker 1204 then adds this class to its internal CIMOM registry (i.e., the registration table). When a request for this class comes in, the CIMOM registry broker 1204 reads in the contents of the namespace resolved CIM object and if it qualifies as the "special link CIM object", then a connection is made to the URL specified in there through M-channels. It should be noted that the softlink is an example of data stored at the registration table and other metadata may instead be stored.

One or more of the steps of the methods described herein and other steps described herein may be implemented as software embedded on a computer readable medium, such as the memory and/or data storage, and executed on a computer system, for example, by a processor. Also, M-agents, the CIMOM registry broker, CIMOMs and portions of M-channels may comprise software. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of providing information from a plurality of common information model object managers (CIMOMs) in a system, the method comprising:
   storing registration information for the plurality of CIMOMs at a CIMOM registry broker in the system, wherein the registration information is associated with objects hosted at the plurality of CIMOMs;

receiving a request at the CIMOM registry broker from an entity external to the system;
searching the registration information to identify information relevant to the request;
for any registration information relevant to the request, requesting objects corresponding to the relevant registration information from the CIMOMs hosting the objects;
correlating information in objects received from the CIMOMs;
sending the correlated information to the entity;
periodically sending a discovery message from the CIMOM registry broker to an agent in the system operable to receive the discovery message, wherein the agent is associated with a CIMOM of the plurality of CIMOMs and is operable to exchange information, including the objects, with the CIMOM registry broker via a management channel in the system; and
in response to the agent responding to the discovery message, determining if the agent is a new agent or an agent previously registered.

2. The method of claim 1, further comprising:
if the determined agent is a new agent, creating an entry for the new agent in a registration table after successful negotiation; and
if the determined agent is a previously registered agent, then updating the registration table with a renewal if continued participation is agreed upon.

3. The method of claim 2, wherein storing registration information for the plurality of CIMOMs comprises:
for each CIMOM, receiving any namespaces and classes hosted by the CIMOM from the agent for the CIMOM; and
storing a soft link in the registration table for each namespace, wherein the soft link identifies a location of the CIMOM, the namespace and any classes in the namespace.

4. The method of claim 3, further comprising:
for overlapping namespaces, unifying classes with an existing overlapping namespace.

5. The method of claim 4, further comprising:
for conflicting namespaces or classes, assigning a unique prefix or suffix to the soft link, wherein the prefix or suffix is based on an arrival order of the received namespaces.

6. The method of claim 3, wherein searching the registration information further comprises:
searching the soft links in the registration table for any classes relevant to the request;
for each class, determining the location of the CIMOM hosting objects for the class from the corresponding soft link;
wherein requesting objects comprises, for each class, using the location of the CIMOM hosting objects for the class to send a request to the corresponding agent for any objects relevant to the request from the entity external to the system; and
receiving any relevant objects from the corresponding agent.

7. The method of claim 6, further comprising:
if results of the searching of the soft links in the registration table for any classes relevant to the request include multiple soft links with the same class name, then performing one of a first match, a priority match or a user-driven match to select one of the multiple soft links.

8. The method of claim 6, wherein correlating information further comprises:
receiving objects from a plurality of CIMOMs, wherein the objects are relevant to the request from the entity external to the system;
creating a single response table for the received objects; and
sending the correlated information comprises sending the single response table to the entity.

9. The method of claim 3, further comprising:
receiving an update message from one of the agents;
determining if the update message indicates a new class for the namespace hosted by the CIMOM associated with the agent; and
creating a softlink for the new class in the registration table if the update message indicates a new class.

10. The method of claim 9, further comprising:
determining if the update message indicates a deletion of a class; and
updating the softlink in the registration table to indicate the objects for the class are deleted.

11. The method of claim 2, further comprising:
exchanging information between the CIMOM registry broker and the agents using management channels.

12. The method of claim 11, wherein the management channels are operable to provide communication between management hardware, guest virtual machines and a management virtual machine on a single server.

13. The method of claim 1, wherein the request is an inventory request and the objects are associated with hardware and software in the system.

14. A system for coordinating information between management entities in the system, the system comprising:
a CIMOM registry broker storing registration information for a plurality of CIMOMs in the system, the CIMOM registry broker being operable to
extract objects from at least some of the plurality of CIMOMs in response to a request from an entity external to the system,
correlate information in the extracted objects into a single response table, and
send the single response table to the entity external to the system;
a plurality of agents, wherein each agent is associated with one of the plurality of CIMOMs and is operable to communicate information from the CIMOMs to the CIMOM registry broker; and
at least one management channel providing bidirectional communication between the CIMOM registry broker and the agents in the system, wherein at least one of the agents and the CIMOM registry broker are running on a virtual machine,
wherein the CIMOM registry broker is further operable to
periodically send a discovery message from the CIMOM registry broker to the agents in the system operable to receive the discovery message, and
in response to every agent responding to the discovery message, determine if the agent is a new agent or an agent previously registered.

15. The system of claim 14, wherein the CIMOM registry broker is further operable to participate in registration and update phases with the agents to maintain a registration table identifying namespaces and classes hosted by the CIMOMs in the system and locations of the CIMOMs in the system, and
if the determined agent is a new agent, the CIMOM registry broker is operable to create an entry for the new agent in a registration table, and if the determined agent is a previously registered agent, the CIMOM registry broker is operable to update the registration table with a renewal if continued participation is agreed upon.

16. The system of claim 14, wherein the agents reside on guest virtual machines and management hardware, and the CIMOM registry broker resides on a management virtual machine, a guest virtual machine, or the management hardware.

17. The system of claim 14, wherein the CIMOM registry broker, the agents, the at least one management channel and the CIMOMs are provided on a single server.

18. A non-transitory computer readable medium including computer executable instructions performing a method of providing information from a plurality of common information model object managers in a system, the method comprising:

- storing registration information for the plurality of CIMOMs at a CIMOM registry broker in the system, wherein the registration information is associated with objects hosted at the plurality of CIMOMs;
- receiving a request at the CIMOM registry broker from an entity external to the system;
- searching the registration information to identify information relevant to the request;
- for any registration information relevant to the request, requesting objects corresponding to the relevant registration information from the CIMOMs hosting the objects;
- correlating information in objects received from the CIMOMs; sending the correlated information to the entity;
- periodically sending a discovery message from the CIMOM registry broker to an agent in the system operable to receive the discovery message, wherein the agent is associated with a CIMOM of the plurality of CIMOMs and is operable to exchange information, including the objects, with the CIMOM registry broker via a management channel in the system; and
- in response to the agent responding to the discovery message, determining if the agent is a new agent or an agent previously registered.

19. The non-transitory computer readable medium of claim 18, wherein the method further comprises:

if the determined agent is a new agent, creating an entry for the new agent in a registration table after successful negotiation.

20. The non-transitory computer readable medium of claim 19, wherein the method further comprises:

if the determined agent is a previously registered agent, then updating the registration table with a renewal if continued participation is agreed upon.

* * * * *